United States Patent [19]

Thurnau et al.

[11] 4,444,001
[45] Apr. 24, 1984

[54] TOBACCO HARVESTER

[76] Inventors: Henry J. Thurnau, 216 Voorhees Ave., New Milford, N.J. 07646; Ray K. Smalling, Rte. 2, Box 15; Peter F. Thurnau, Rte. 2, Box 210, both of Lafayette, Tenn. 37083

[21] Appl. No.: 431,594

[22] Filed: Sep. 30, 1982

[51] Int. Cl.³ ............................................. A01D 45/16
[52] U.S. Cl. ..................................................... 56/27.5
[58] Field of Search ......................................... 56/27.5

[56] References Cited

U.S. PATENT DOCUMENTS 1,999,638  4/1935  Richards ............................... 56/27.5
2,923,116  2/1960  Brown .................................. 56/27.5

*Primary Examiner*—Jay N. Eskovitz
*Attorney, Agent, or Firm*—Harrington A. Lackey

[57] ABSTRACT

A tobacco harvesting apparatus including a mobile frame, having a cutting station comprising a rotary cutter blade, a rotary paddle assembly, and a receiver for a longitudinally and forward projecting tobacco stick in a stick receiving position behind the cutting station, whereby forward movement of the mobile frame causes the cutting station to move along a row of tobacco plants so that the tobacco stalk is cut by the rotary cutter blade and is impaled and moved along the tobacco stick by the rotary paddle assembly.

The apparatus further includes an automatic stick ejector mechanism for receiving the rear end of the tobacco stick and rotating the tobacco stick upward and behind the mobile frame upon actuation by a predetermined accumulation of stalks upon the tobacco stick, and a stick feeding mechanism for feeding one stick at a time from a stick reservoir to the stick receiver, operating in synchronism with the stick ejector mechanism.

11 Claims, 7 Drawing Figures

TOBACCO HARVESTER

BACKGROUND OF THE INVENTION

This invention relates to an agricultural harvesting apparatus, and more particularly to a tobacco harvester.

Much of the tobacco harvesting is accomplished by manually cutting the stalks of the tobacco plants and manually impaling the stalks of the tobacco plants over preformed tobacco sticks or spikes. After a certain number of tobacco stalks are impaled upon a stick, such as six to ten stalks per stick, the loaded tobacco sticks are conveyed to a tobacco barn and suspended in rows for drying or curing.

There are prior tobacco harvesting machines adapted to automatically cut the tobacco stalks as the machine moves over the ground along a row of tobacco stalks and to support an operator who manually collects each stalk as it is cut and impales the stalk over a tobacco stick. The loaded tobacco sticks are discharged from the vehicle, or otherwise collected for transportation to the tobacco barns for curing. This type of tobacco harvester is illustrated in the U.S. Spratt et al U.S. Pat. No. 4,216,642.

The following U.S. patents disclose various types of tobacco harvesters having power-driven blades for cutting the tobacco stalks, and means for automatically impaling the stalks upon spears or tobacco sticks, U.S. Pat. Nos.:

| | | |
|---|---|---|
| 1,055,023 | De Leon | Mar. 4, 1913 |
| 1,090,747 | Nunnelley | Mar. 17, 1914 |
| 1,134,184 | Cook | Apr. 6, 1915 |
| 1,217,495 | Pence | Feb. 27, 1917 |
| 1,323,404 | Motter et al | Dec. 2, 1919 |
| 2,477,068 | Motte | July 26, 1949 |
| 2,836,950 | Anderson | June 3, 1958 |
| 2,923,116 | Brown | Feb. 2, 1960 |
| 3,059,401 | Woods | Oct. 23, 1962 |
| 3,079,744 | Newswanger | Mar. 5, 1963 |
| 3,347,030 | Woods | Oct. 17, 1967 |
| 3,593,506 | Casada et al | July 20, 1971 |
| 3,798,884 | Middleton | Mar. 26, 1974 |
| 3,855,762 | Middleton | Dec. 24, 1974 |
| 3,902,607 | Middleton | Sept. 2, 1975 |

The Meyer U.S. Pat. No. 3,393,501 is an automatic agricultural harvesting machine for harvesting brussels sprouts.

The above Cook, Brown, Newswanger, and Meyer patents disclose various types of rotary vanes, blades, or fingers, for engaging the tobacco plant, or brussels sprouts plant, about the same time the plant is cut, for sustaining or moving the plant rearwardly. The vanes and fingers disclosed in Cook, Brown, Newswanger patents support the plant as it is being impaled upon the tobacco spear or stick.

The above Cook U.S. Pat. No. 1,134,184 (stick magazine 86), the Motter et al U.S. Pat. No. 1,323,404 (Lath hopper 160), the Anderson U.S. Pat. No. 2,836,905 (stick rack 146), the Brown U.S. Pat. No. 2,923,116 (tobacco stick magazine 48), the Casada et al U.S. Pat. No. 3,593,506 (magazine in FIG. 9), and the three Middleton U.S. Pat. Nos. 3,798,884, 3,855,762, and 3,902,607 (stick supplies 96 and 46), all disclose various types of tobacco stick magazines or receptacles, and various types of means for delivering one stick at a time into an impaling position.

The Newswanger U.S. Pat. No. 3,079,744 (FIG. 4) discloses a manually operated, vertically swingable, stick holder 219 for ejecting a tobacco stick 216.

The Casada et al U.S. Pat. No. 3,593,506 (FIGS. 9 and 13) discloses a rotary ejector mechanism for raising a loaded tobacco stick vertically for removal.

The Middleton U.S. Pat. No. 3,798,884 discloses a loaded tobacco stick ejector mechanism 92 for elevating the loaded tobacco stick for ejection (FIG. 14).

SUMMARY OF THE INVENTION

It is an object of this invention to provide a tobacco harvester including a mobile frame, such as a draft vehicle, supporting a rotary cutter blade for sequentially cutting the stalks of tobacco plants in a row along which the mobile frame moves, and supporting a tobacco stick in a position for impaling the cut tobacco stalk upon the stick.

The tobacco harvester made in accordance with this invention further contemplates a paddle assembly including a rotary member, adjacent the cutting blade, supporting a plurality of radially extending paddle members for engaging and urging each stalk, about the time it is cut, upon the pointed end of the tobacco stick. Each of these paddle members is particularly constructed to include a vertically spaced pair of upper and lower radially projecting arm members for engaging the stalk at two vertically spaced points above and below the tobacco stick in order to more efficiently impale and carry the stalk along the tobacco stick. Each paddle member is preferably pivotally supported upon a rotary member so that the paddle member will yield to any excessive resistance by the stalks as the paddle members move rearwardly through the cutting station, yet will be restored by spring means to their normal radial positions after the pressure upon the arm members has been relieved.

Each paddle member also preferably includes means for independently pivotally supporting each upper arm upon its corresponding paddle member for upward movement, and spring means urging the upper arm downward to a normal, horizontal, radially extending position. Thus, the upper arm may yield to upward pressure from a rising loaded tobacco stick during its ejection from the harvester.

The tobacco harvester made in accordance with this invention also preferably includes an elongated stick ejector box supported at the rear end of the harvester in longitudinal alignment with the tobacco stick upon which the stalks are impaled and receiving the rear or butt end of the tobacco stick. The ejector box is mounted for pivotal movement in a vertical plane. When a sensor is engaged by the rearward moving tobacco stalks on a fully loaded stick, the stick ejector box is actuated to rotate the loaded stick upward and rearwardly to a discharge position.

The tobacco harvester further includes a stick hopper or receptacle and a rotary chain conveyor feed mechanism for transferring one tobacco stick at a time from the hopper to a stick receiver. The stick conveyor mechanism is driven in synchronism with the stick ejector box, in a preferred form of the invention.

The mobile frame may be drawn by a tractor or other power-driven prime mover, and the motors for driving the rotary cutter blade, the rotary paddle assembly and for actuating the stick ejector box and the stick feeding mechanism, may be hydraulically actuated and powered by a rotary hydraulic pump connected to the power take-off of the tractor vehicle.

DESCRIPTION OF THE PREFERRED EMBODIMENTS

Figure 1:
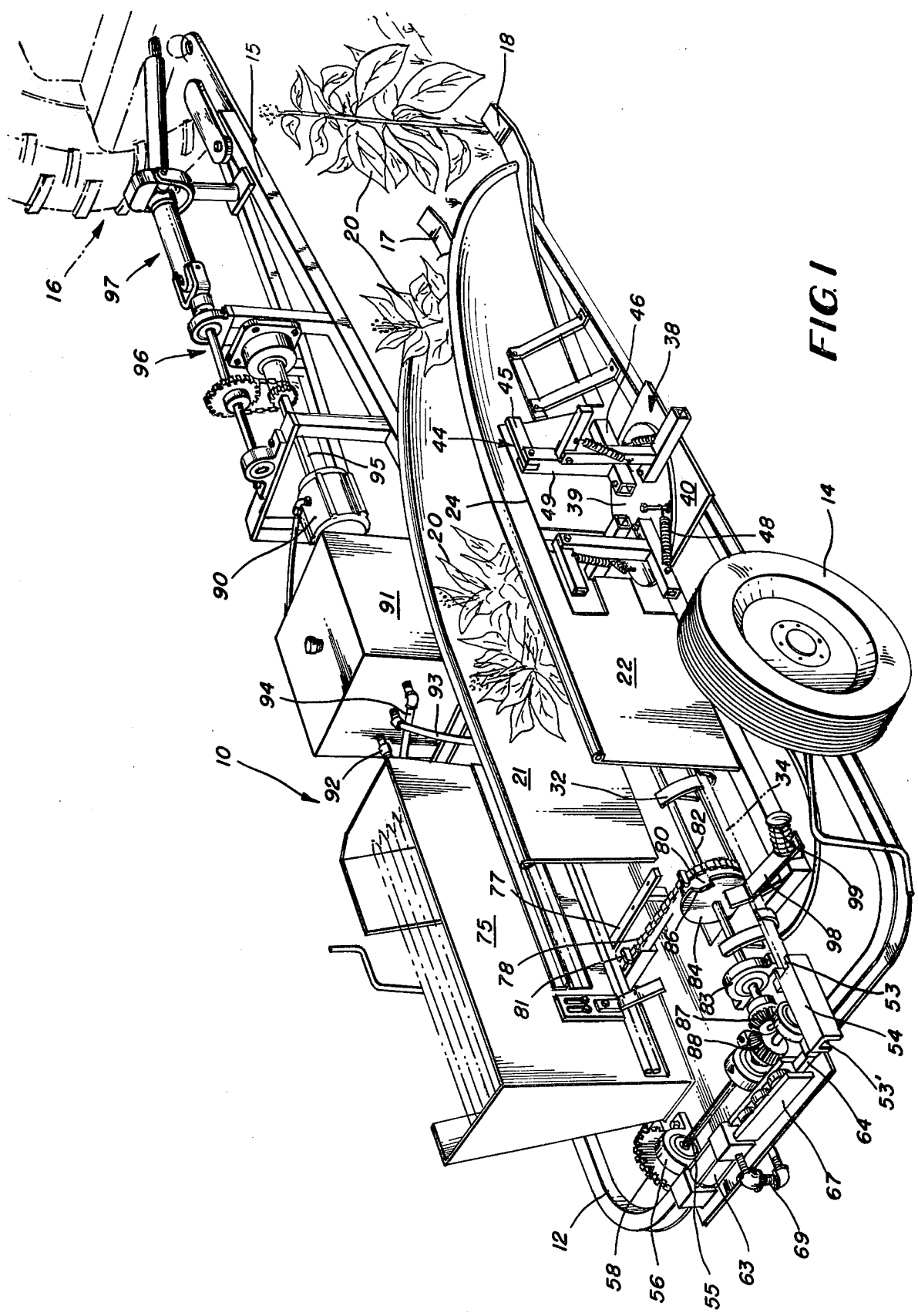
FIG. 1 is a top rear perspective view of the tobacco harvester, made in accordance with this invention, being drawn by a tractor, disclosed in phantom, for harvesting a row of tobacco plants.
Figure 2:
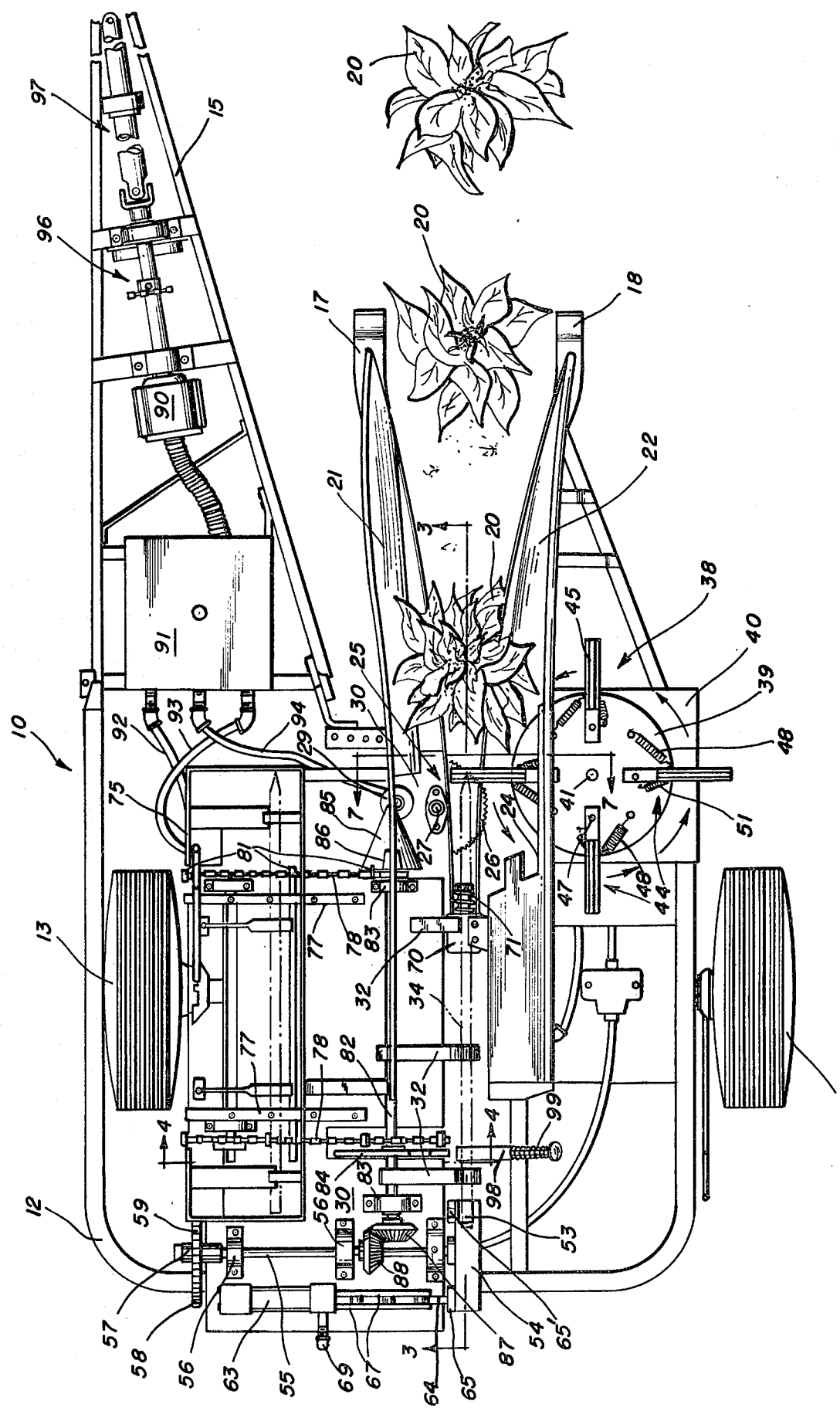
FIG. 2 is a top plan view of the tobacco harvester, disclosed in FIG. 1.

Referring now to the drawings in more detail, FIGS. 1 and 2 disclose a tobacco harvester 10 made in accordance with this invention, and in the form of a draft vehicle including a mobile frame 12 supported by a pair of ground-engaging wheels 13 and 14. The left front end portion of the mobile frame 12 includes a tongue member 15 adapted to be coupled to the trailer hitch of a prime mover, such as the tractor 16, disclosed in phantom in FIG. 1.

Projecting from the right front end portion of the mobile frame 12 are a pair of ground-engaging skids 17 and 18 transversely spaced far enough to straddle a longitudinal row of tobacco plants 20. Fixed to the skids 17 and 18 and projecting rearwardly are a pair of transversely spaced guide members or guide plates 21 and 22. In substantially the middle portion of the guide plates 21 and 22 in a transverse opening 24 adjacent a cutting station 25.

Located as the cutting station 25 is a cutter blade, such as the rotary saw blade 26 mounted for rotation about a vertical axis on the saw arbor 27 journaled in the mounting plate 30. The arbor 27 is driven through chain and sprocket transmission 28 from the hydraulic cutter motor 29. The motor 29 is preferably mounted on top of the mounting plate 30, while the rotary cutter blade 26 is mounted below the mounting plate 30, so that the cutter blade 26 will be close to the ground 31 over which the harvester vehicle 10 travels.

Figure 3:
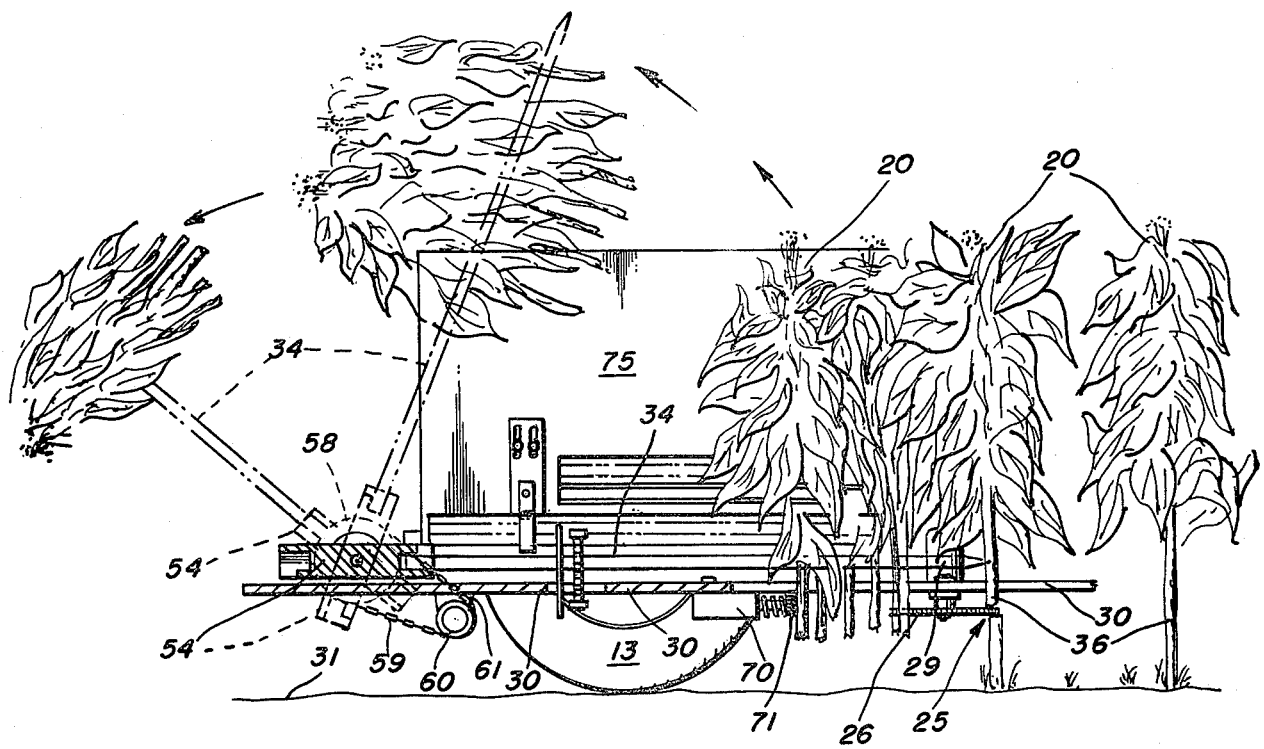
FIG. 3 is a fragmentary section, taken along the line 3—3 of FIG. 2, illustrating the stick ejector box in different operative positions.

Fixed to the mounting plate 30 behind the cutting station 25 are a plurality of stick receiver brackets 32 adapted to hold an elongated tobacco spear, stick or spike 34, in a longitudinally extending stick receiving position, as illustrated in FIGS. 1 and 2. In the stick receiving position, the stick 34, having a pointed end 35, is adapted to project forwardly over the cutter blade 26. The pointed end 35 is adapted to extend very close to vertical alignment with the leading edge of the cutter blade 26, as illustrated in FIGS. 2 and 3. Thus, when the stalk 36 of a tobacco plant 20 commences to be severed by the leading edge of the cutter blade 26, it is practically simultaneously impaled upon the pointed end 35 of the tobacco stick 34 in the stick receiving position.

Figure 7:
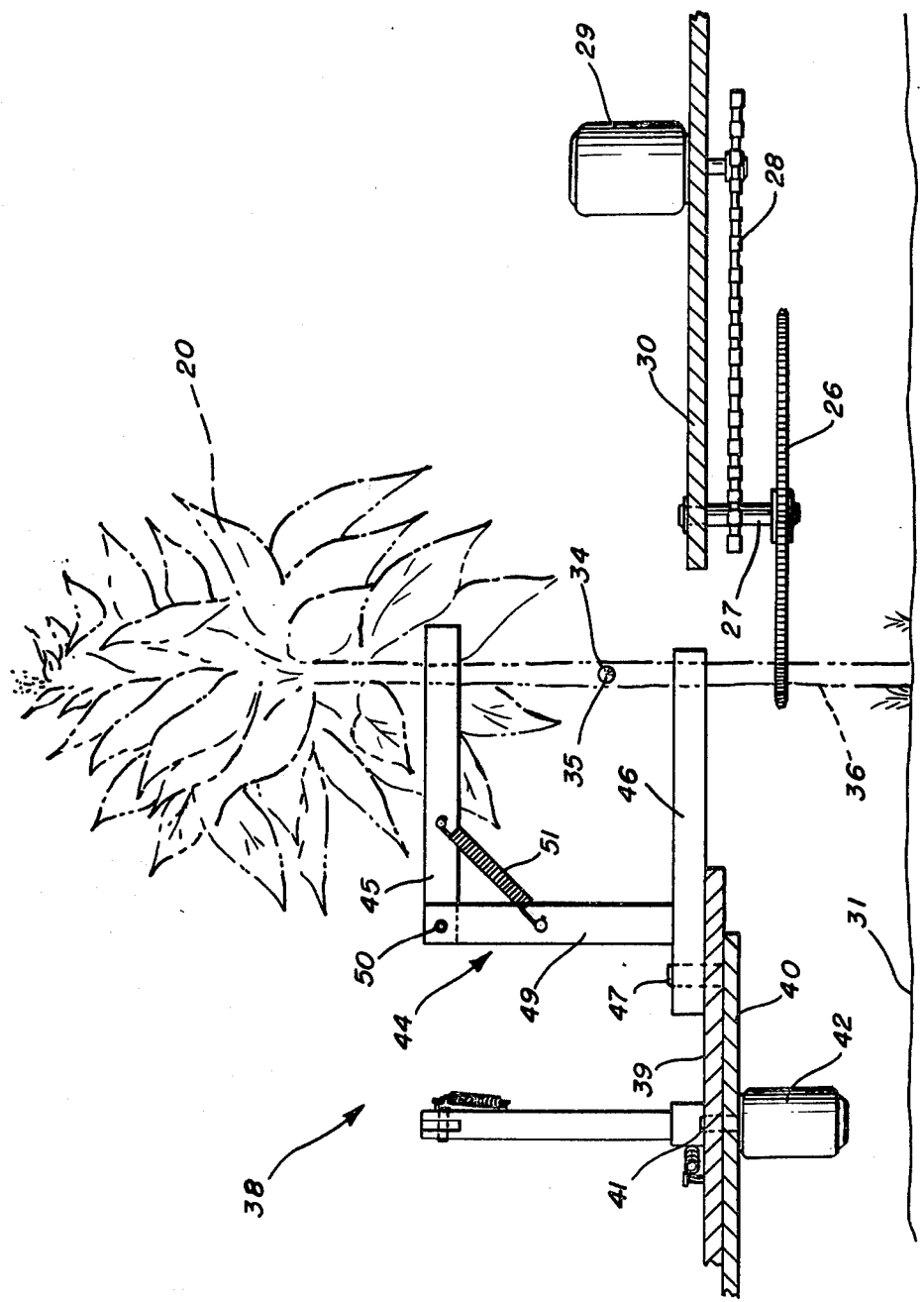
FIG. 7 is an enlarged fragmentary section, taken along the line 7—7 of FIG. 2.

Projecting through the opening 24 in the guide member 22 adjacent the cutting station 25, is a paddle assembly 38 including a rotary member or disc 39 rotatably mounted upon a mounting plate 40 by means of rotary shaft 41. The rotary shaft 41 is driven by the hydraulic motor 42 supported beneath the mounting plate 40, as best illustrated in FIG. 7.

Circumferentially mounted upon the rotary disc 39 are a plurality (four shown in the drawings) of paddle members 44. Each paddle member 44 includes vertically spaced, upper and lower arms 45 and 46 projecting radially from the rotary disc 39. The rotary member could be a plurality of radial arms, each arm pivotally supporting a paddle member 44, instead of the rotary disc 39, if desired.

Figures 5, 6:
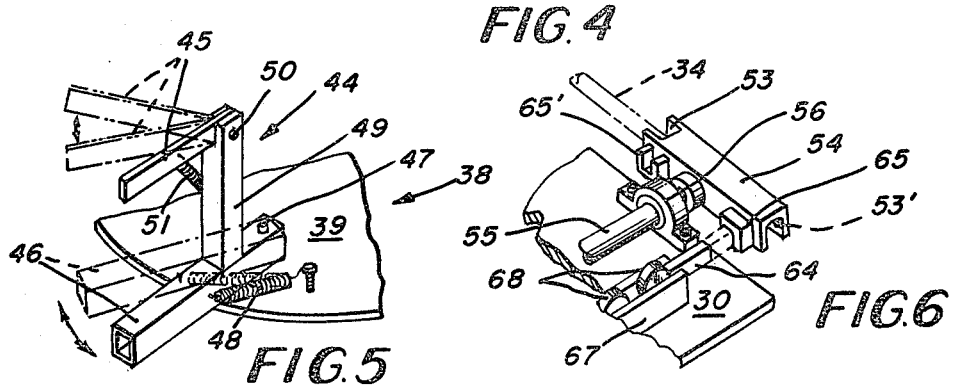
FIG. 5 is a fragmentary top perspective view of a portion of the paddle assembly illustrating the different pivotal positions of a paddle member and an upper arm.
FIG. 6 is a fragmentary top rear perspective view of the stick ejector box and the latch mechanism for the stick ejector box.

As best illustrated in FIG. 5, each paddle member 44 is pivotally mounted upon the rotary disc 39 by a vertical pivot pin 47 securing the rear extension of the lower arm 46 to be rotary disc 39.

A spring member, such as the coil spring 48, connects the leading side of the lower arm 46 to the rotary disc 39, as illustrated in FIGS. 2 and 5, so as to position the lower arm 46, and consequently the entire paddle member 44, in a substantially radial normal position relative to the rotary disc 39. When the paddle member 44, and more specifically either the upper arm 45 or the lower arm 46, engages an obstacle as the rotary disc 39 revolves, the arms 45 and 46 will pivot in a trailing direction as the coil spring 48 yields to the force of the obstacle engaging either or both the arms 45 and 46, as best illustrated in FIG. 5. The most common obstacle encountered by the paddle member 44 is an accumulation of tobacco stalks 36 impaled upon the tobacco stick 34 as the paddle member 44 moves through the cutting zone 25. Thus, excessive pressure exerted by the accumulation of tobacco stalks 36 will cause the paddle member 44 to pivot and yield rather than to remain rigid and become damaged or broken as the rotary disc 39 continues its rotary movement.

The paddle member 44 includes the upright post 49 projecting upward from the lower arm 46. The inner end of the upper arm 45 is connected by horizontal pin 50 to the upper end portion of the post 49 for pivotal movement in a vertical plane. The upper arm 45 is secured to the post by a second coil spring 51 to normally urge the upper arm 45 downward into a substantially horizontal radial position, as illustrated by the solid-line position of the upper arm 45 in FIG. 5. Upward pressure upon the arm 45 will pivot the arm 45 upward against the action of the coil spring 51, as illustrated by the phantom positions of the upper arm 45 in FIG. 5.

Thus, as the apparatus 10 is drawn forward by the tractor 16 in such a manner that the guide members 21 and 22 straddle a row of tobacco plants 20, so that the cutting zone 25 is aligned with the longitudinal row of tobacco plants 20, the pointed end 35 of the tobacco stick 34 in the stick receiving position, penetrates each successive stalk 36 about the same time that the rotary blade 26 cuts the stalk below the stick 34. In order to force the cut stalk 36 along the tobacco stick 34, and in many instances to assist the stalk 36 in being impaled upon the sharp pointed end 35, the stalk 36 is engaged above and below the pointed end 35 of the stick 34 by both radial arms 45 and 46 of a revolving paddle member 44. After the paddle member 44 pushes the stalk 36 along the stick 34 as far as its travel permits, the paddle member 44 disengages the stalk to continue its rotation away from the cutting zone 25. The next successive paddle member 44 then rotates across the cutting zone 25 to encounter and force any tobacco stalk 36 which might be in its path, upon and along the tobacco stick 34.

When a tobacco stick 34 rests upon the receiver brackets 32 in a stick receiving position, as illustrated in FIGS. 1 and 2, the rear or butt end of the tobacco stick 34 is received in a socket 53 of a rotary ejector box 54, in its normal inoperative position extending longitudinally in coaxial alignment with the tobacco stick 34.

The mid-portion of the stick ejector box 54 is fixed to an elongated transverse rotary ejector shaft 55 rotatably carried in the bearings 56 on the mounting plate 30. The opposite end of the ejector shaft 55 from the ejector box 54 terminates in a slip clutch 57, which in turn is secured to a large sprocket 58, carrying a chain 59 from a drive sprocket 60 driven by hydraulic motor 61, supported on the bottom of mounting plate 30, as disclosed in FIG. 3.

Mounted rearwardly of, and parallel to, the rotary ejector shaft 55 is a hydraulic latch cylinder 63 reciprocally controlling a piston rod 64 and normally projecting the piston rod 64 to a latching position engaging the latch lug or keeper 65 fixed to the rear end of the stick ejector box 54. The piston rod 64 is guided between the plates 67 and beneath the guide rollers 68.

An inverted socket 53', identical to the socket 53, is formed in the opposite end, that is the rear end disclosed in FIGS. 1 3, and 6, of the ejector box 54, and an identical inverted latch lug 65' is formed on the same side of the ejector box 54 as the latch lug 65, but on the front section of the box 54, as illustrated in FIG. 6. Thus, when the ejector box 54 is rotated in a vertical plane through 180°, as disclosed in FIG. 3, the socket 53' will be transferred to a position for receiving the rear end of another tobacco stick 34 in stick receiving position, while the latch lug 65' will be in position for engagement by the projected piston rod 64.

The latch cylinder 63 is connected by a hydraulic line 69 to a hydraulic valve 70 mounted beneath the mounting plate 30. The valve 70 has a forward projecting and reciprocal plunger 71 in the same vertical plane as the stick receiving position. When the plunger 71 is moved rearwardly, such as by tobacco stalks moving rearward on the stick 34, the hydraulic valve 70 is opened to permit hydraulic fluid to pass through the line 69 into the latch cylinder 63 to retract the piston rod 64 and thereby disengage the corresponding latch lug 65 or 65'. Since the hydraulic motor 61 is continually actuated, the sprocket 58 is continually driven. When the ejector box 54 is unlatched, the slip clutch 57 transmits power to the ejector shaft 55 to rotate the shaft 55 and the ejector box 54 through 180°, thereby lifting the tobacco stick 34 loaded with tobacco stalks 20, as illustrated in FIG. 3, to a position discharging the loaded tobacco stick 64 behind the frame 12.

The plunger 71 is depressed by engagement of the accumulated and compressed stalks 36 of the tobacco plants 20 impaled upon the tobacco stick 34 in its receiving position. Thus, when the tobacco stick 34 has been impaled with a predetermined quantity of tobacco stalks, then the plunger 71 opens the valve 70 to unlatch the box 54 and permit it to be rotated as previously described. As soon as the stick is lifted, the accumulated tobacco stalks are lifted out of engagement with the plunger 71 to permit the plunger 71 to project forward again to its normal inoperative position to close the hydraulic valve 70. The pressure in the hydraulic cylinder 63 is then reversed to permit the piston rod 64 to project into a position engaging the latch lug 65' when the ejector box 54 has been rotated through its 180° cycle.

In order to supply tobacco sticks 34, one at a time, to the stick receiving position after each loaded tobacco stick is ejected by the stick ejector box 54, a hopper or receptacle 75 is mounted on the rear portion of the frame 12 to receive a stack, or plurality, of tobacco sticks 34. The hopper 75 has an opening 76 in its bottom wall for ejecting one stick 34 at a time downward upon a pair of parallel horizontal transversely extending runners 77.

In order to transport the tobacco sticks 34 along the runners 77, a pair of endless feed chains 78, trained around the sprockets 79 and 80, carry uniformly spaced radially projecting stick lugs 81 to move one stick at a time toward the receiving position. The sprockets 80 are fixed upon an elongated longitudinally extending rotary feed shaft 82 journaled in bearings 83 mounted on the mounting plate 30.

Also fixed upon the rotary feed shaft 82 is a notched rear disc 84 and a front notched conical member 85. The conical member 85 and the disc 84 carry longitudinally aligned notches 86 for receiving a stick 34 deposited in the notches 86 by the lugs 81, as the chain 78 returns toward the sprocket 79. As the notches 86 rotate below the horizontal, the stick 34 is deposited upon the receiver brackets 32 to permit the stick 34 to roll or slide down into the stick receiving position in the brackets 32.

The rear end of the rotary feed shaft 82 is provided with a miter gear 87 engaging at right angles another miter gear 88 fixed upon the rotary ejector shaft 55 (FIGS. 1 and 2). Thus, the rotary feeding chains 78 are driven simultaneously with the ejector shaft 55 and the stick ejector box 54. As a loaded stick 34 is ejected from its stick receiving position to an ejecting position, as illustrated by the phantom positions of the stick 34 in FIG. 3, another stick 34 is fed by the lugs 81 to the receiver brackets 32. After the stick ejector box 54 has been rotated through its 180° cycle and latched in a stationary operative position, the feeding chains 78 are also stopped until the next cycle.

Hydraulic fluid to the motors 29, 42, and 61 is supplied by hydraulic pump 90, hydraulic reservoir 91, and hydraulic lines, such as lines 92, 93, and 94, as best illustrated in FIGS. 1 and 2. The hydraulic pump 90 is driven through a shaft 95 (FIG. 1), transmission 96 and shaft coupling mechanism 97 from the power takeoff of the tractor 16.

Figure 4:
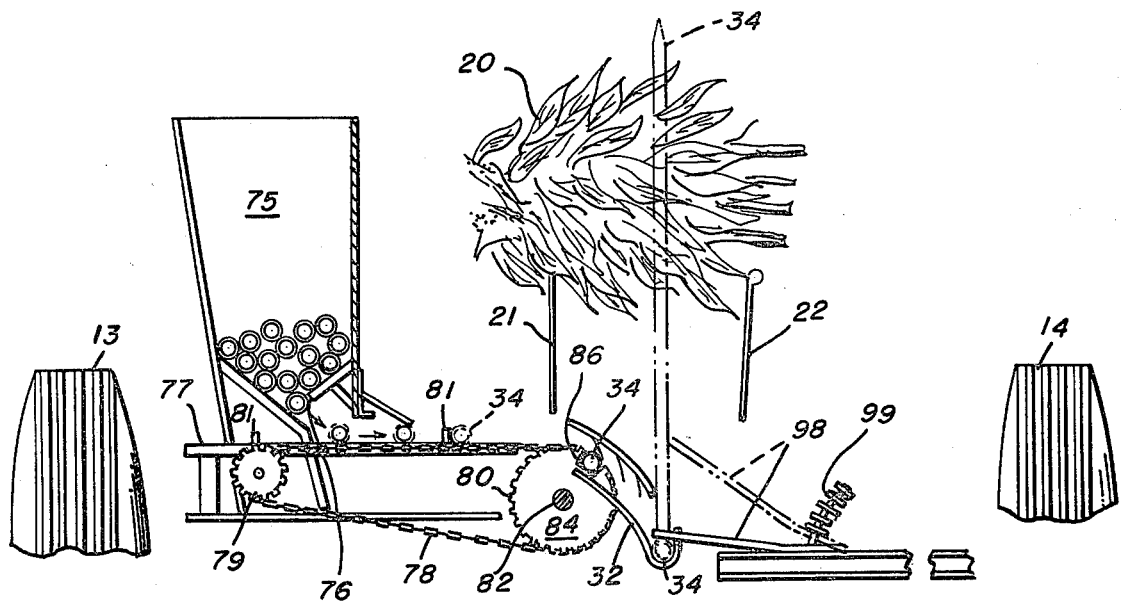
FIG. 4 is an enlarged fragmentary schematic section, taken along the line 4—4 of FIG. 2.

A stick retainer member 98 (FIGS. 1, 2 and 4) is mounted on the rear of the frame 12 adjacent the rear end portion of a tobacco stick 34 disposed in its stick receiving position. The retainer member 98 extends transversely across the rear end portion of the stick 34 to hold the stick down as the stick 34 is being loaded with tobacco plants 20. The retainer member 98 is maintained in its retaining position by a coil spring 99 with sufficient pressure to permit the retainer member 98 to yield upwardly when the stick ejector box 54 is rotated. A rising stick 34 forces upward the retainer member 98 against the pressure spring 99, as best illustrated in FIG. 4, to permit the loaded stick 34 to be ejected. After the stick 34 passes the retainer member 98, the spring 99 forces the retainer member 98 back down into its normally retaining position. By the time the retainer member 98 has returned to its retaining position, another stick 34 has been fed into the receiver brackets beneath the retainer member 98 for retention thereby until the next ejection cycle.

The operation of the tobacco harvester 10 is readily apparent from the above description. With the frame 12 coupled to a prime mover, such as the tractor 16, the harvester 10 is drawn over the ground 31 of a field of standing tobacco plants 20, in such a manner, that the skids 17 and 18 and the guides 21 and 22 straddle a longitudinal row of tobacco plants 20.

In the operative mode of the tobacco harvester 10, a pointed tobacco stick 34 is supported in the receiver brackets 32, in receiving position such that the pointed end 35 of the tobacco stick 34 is substantially in vertical alignment with the leading edge of the rotary saw blade 26.

The hydraulic pump 90 is operated by the power take-off of the tractor 16 to supply fluid to the three hydraulic motors, the cutter motor 29, the paddle assembly drive motor 42, and the hydraulic motor 61 (FIG. 3), which drives the stick feeding mechanism and the ejector box 54.

As the first tobacco plant 20 is guided between the guide members 21 and 22, and is approached and cut by the rotary saw blade 26, one of the rotary paddle members 44 engages the stalk 36 of the plant 20 to urge the stalk toward the pointed end 35 of the tobacco stick 34. About the same time that the rotary saw blade 26 engages and severs the stalk, the paddle member 44 urges the stalk 36 upon the pointed end 35 of the stick 34. After the stalk 36 is impaled upon the tobacco stick 34, the upper and lower arms 45 and 46 of the paddle member 44 continue to engage and force the severed stalk 36 rearward along the stick 34 until the revolving upper and lower arms 45 and 46 move away from the cutting station 25 to disengage the impaled stick 36.

As the frame 12 continues to move forward, a subsequent paddle member 44 engages the next tobacco plant 20 to impale it upon the pointed end 35 of the tobacco stick 34 as the stalk 36 is cut by the rotary saw 26. This paddle member 44 continues to move the severed stalk along the stick 34 until the second impaled stalk 36 engages the first impaled stalk, thereby forcing the first severed stalk rearward a small increment.

This procedure continues until several stalks have been severed, impaled, and accumulated upon the tobacco stick 34. When a sufficient number of stalks 36 have been impaled upon the stick 34 to cause the rearmost stalk to engage and depress the plunger 71, then the hydraulic valve 70 is opened to actuate the latching cylinder 63 to retract the piston rod 64, thereby unlatching the ejector box 54, causing the shaft 55 to be driven by the slip clutch 57 to rotate the ejector box 54 through a vertical arc of 180°. As the ejector box 54 rotates, as disclosed in FIG. 3, it carries with it the loaded tobacco stick 34. The upward moving tobacco stick 34 raises the retainer member 98 to its dashed-line position disclosed in FIG. 4, as well as any pivoted upper arm 45 lying across its path, permitting the free passage of the loaded tobacco stick 34 rearward to a discharge position in which the loaded tobacco stick is ejected from the ejector box upon the ground 31 to the rear of frame 12. The ejected loaded tobacco sticks 34 may then be retrieved by another operator, collected and transported to the tobacco barn for curing.

Also, the rising loaded tobacco stick 34 permits the protraction of the valve plunger 71 to restore the latching piston rod 64 to its protracted latching position to hold the ejector box 54 in its reversed latched position for receiving the next tobacco stick 34 from the stick hopper 75.

As previously described, the unlatching of the ejector box 54 permits simultaneous actuation of the feed chains 78 to move the next tobacco stick 34 from the chains 78 into the receiving station defined by the receiver brackets 32.

This procedure continues until the desired number of rows of tobacco plants 20 have been harvested.

The unique construction of the paddle assembly 38, including the vertically spaced upper and lower arms 45 and 46, and the spring-biased pivotal connections of the lower arm 46 to the rotary member 39 and the upper arm 45 to the vertical post 44, provides a more efficient means for impaling tobacco stalks upon a tobacco stalk, with a minimum of maintenance required for the paddle assembly.

Whereas, conventionally eight laborers can manually cut and spike two to four acres of tobacco plants per day, the tobacco harvester 10, made in accordance with this invention, can do the same amount of work in the same amount of time with only two operators. One operator drives the tractor 16, while the other operator fills the stick hopper 75.

What is claimed is:

1. A tobacco harvesting apparatus comprising:
   (a) a mobile frame having a cutting station adapted to be moved in a forward longitudinal direction along a row of tobacco plants having stalks projecting upward from the ground,
   (b) a movable cutter blade mounting on said frame at said cutting station in the path of the tobacco stalks, means for driving said movable cutter blade to cut each successive stalk adjacent the ground as said frame moves forward over the ground,
   (c) a stick receiver on said frame behind said cutting station for supporting a tobacco stick having a pointed end longitudinally in a stick receiving position, in which said pointed end projects forward and is located at said cutting station above said cutter blade,
   (d) a paddle assembly mounted on said frame adjacent said cutting station for rotary movement about an upright axis, and comprising a plurality of circumferentially spaced paddle members,
   (e) each paddle member comprising a pair of vertically spaced, radially projecting, upper and lower arms, each said upper arm being above said stick receiving position and each said lower arm being below said stick receiving position and above said cutter blade, and
   (f) means for driving each said paddle member through said cutting station, so that each said pair of upper and lower arms moving through said cutting station engages and impales a tobacco stalk at said cutting station on a tobacco stalk in said stick receiving position.

2. The invention according to claim 1 in which said paddle assembly further comprises a rotary member, said paddle members being circumferentially spaced on said rotary member, and means pivotally mounting each paddle member on said rotary member about a vertical axis, and spring means urging each of said paddle members to a normal radial position relative to said rotary member, each of said paddle members being adapted to be pivotally moved to a trailing position by an external force greater than said spring means.

3. The invention according to claim 1 further comprising journal means pivotally mounting each of said upper arms in its corresponding paddle member for upward pivotal movement about a horizontal axis, and spring means biasing each said upper arm downward to a normal horizontal radial position.

4. The invention according to claim 1 further comprising stick ejector means for removing a tobacco stick from said tobacco receiving position, and actuator means for said stick ejector means.

5. The invention according to claim 4 in which said stick ejector means comprises a stick lifting means and means for driving said stick lifting means, said actuator means comprising sensing means responsive to the movement of the stalks rearwardly along said tobacco stick for actuating said driving means after a predetermined amount of stalks have been collected upon the tobacco stick.

6. The invention according to claim 5 in which said lifting means comprises a stick ejector box adapted to receive the rear end of a tobacco stick in said receiving position, means mounting said stick ejector box on said frame for rotary movement in a vertical plane, said driving means comprising means for driving said ejector box to rotate in the vertical plane in order to lift a tobacco stick received in said box and through a vertical arc to a stick discharge position.

7. The invention according to claim 6 in which said stick ejector box is fixed to a rotary ejector shaft, said driving means comprising a motor, a slip clutch means coupling said motor to said rotary shaft, hydraulic latch means for normally holding said box in a stationary position in alignment with the stick receiving position, said sensor means comprising a hydraulic valve having a depressible plunger lying in the rearward path of movement of stalks impaled on the tobacco stick in said stick receiving position, said hydraulic valve being operatively connected to said hydraulic latch means for releasing said latch to permit said drive means to rotate said stick ejector box when the accumulated stalks on the tobacco stick depress said plunger.

8. The invention according to claim 7 further comprising stick feeding means for feeding one stick at a time into the stick receiving position, said stick feeding means comprising stick conveyor means, a rotary feed shaft for driving said stick conveyor means, and means coupling said rotary feed shaft and said rotary ejector shaft for simultaneous rotary movement, whereby a tobacco stick is fed to the stick receiving position simultaneously with the rotary movement of the stick ejector box.

9. The invention according to claim 1 further comprising a receptacle for a plurality of tobacco sticks on said frame, a rotary feed conveyor extending from said receptacle to said stick receiving position, stick engaging means on said conveyor for carrying one stick at a time from said receptacle to said stick receiving position.

10. The invention according to claim 8 in which said rotary feed conveyor comprises a pair of rotary chains extending from beneath said receptacle to said stick receiving position, a discharge opening in the bottom of said receptacle for releasing one stick at a time upon said conveyor chains, said stick engaging means comprising a plurality of uniformly spaced lugs on said chains for moving said tobacco sticks toward said stick receiving position.

11. The invention according to claim 6 further comprising a stick retainer member, and spring means mounting said stick retainer member on said frame so that said stick retainer member normally extends over a stick in said stick receiving position to retain said tobacco stick in said stick receiving position, said spring means permitting said stick retainer member to yield to upward pressure of the tobacco stick as the ejector box lifts said tobacco stick upward.

* * * * *